United States Patent
Comeau et al.

(10) Patent No.: US 10,621,283 B2
(45) Date of Patent: Apr. 14, 2020

(54) SYSTEM AND METHODS OF LANGUAGE PROCESSING

(71) Applicant: Just Eat Holding Limited, Borehamwood, Hertfordshire (GB)

(72) Inventors: Gilles Comeau, Bristol (GB); Simon Poole, Bristol (GB); Daniel Cooper, Bristol (GB); Toby Mostyn, Bristol (GB)

(73) Assignee: JUST EAT HOLDING LIMITED, Borehamwood, Hertfordshire (GB)

( * ) Notice: Subject to any disclaimer, the term of this patent is extended or adjusted under 35 U.S.C. 154(b) by 0 days.

(21) Appl. No.: 16/112,227

(22) Filed: Aug. 24, 2018

(65) Prior Publication Data

US 2019/0065471 A1 Feb. 28, 2019

(30) Foreign Application Priority Data

Aug. 25, 2017 (GB) .................................. 1713728.2
Feb. 12, 2018 (EP) .................................. 18156364

(51) Int. Cl.
  *G06F 17/27* (2006.01)
  *G06F 16/31* (2019.01)
  *G06F 16/33* (2019.01)

(52) U.S. Cl.
  CPC ........ *G06F 17/2785* (2013.01); *G06F 16/313* (2019.01); *G06F 16/3331* (2019.01); *G06F 17/2795* (2013.01)

(58) Field of Classification Search
  USPC ............... 704/9, 220; 707/754; 715/256
  See application file for complete search history.

(56) References Cited

U.S. PATENT DOCUMENTS 7,792,846 B1 * 9/2010 Raffill .................. G06F 16/35
                                                            707/754
8,019,748 B1 * 9/2011 Wu ..................... G06F 17/2785
                                                            707/713
(Continued)

OTHER PUBLICATIONS

Park, et al. "An Empirical Analysis of Word Error Rate and Keyword Error Rate" *Journal of Interactive Marketing* Sep. 22, 2008, pp. 2070-2073.

(Continued)

*Primary Examiner* — Akwasi M Sarpong
(74) *Attorney, Agent, or Firm* — Norton Rose Fulbright US LLP

(57) ABSTRACT

The disclosure relates to the field of language processing. A server (30) is configured to respond to a query associated with a user device (21) by sending, to the user device (21), an indication of an item selected based on semantic importance attributed to grams of text in the query. Attributing semantic importance comprises: in the event that a number of occurrences of the gram in a first document is above an occurrence threshold, determining a gram score for said gram based on said number of occurrences; in the event that the number of occurrences of the gram in the first document is below the occurrence threshold, determining the gram score based on: (i) said number of occurrences, and (ii) a reference score for the gram based on a number of occurrences of the gram in a reference document different to the at least one first document; and attributing the semantic importance based on the gram score.

12 Claims, 4 Drawing Sheets

(56) References Cited

U.S. PATENT DOCUMENTS

| | | | |
|---|---|---|---|
| 9,135,243 B1* | 9/2015 | Tellefsen | G06F 17/277 |
| 9,563,665 B2* | 2/2017 | Chen | G06Q 30/0627 |
| 2002/0052740 A1* | 5/2002 | Charlesworth | G10L 15/187 |
| | | | 704/220 |
| 2003/0217052 A1* | 11/2003 | Rubenczyk | G06F 16/3323 |
| 2004/0044952 A1* | 3/2004 | Jiang | G10L 15/00 |
| | | | 715/256 |
| 2004/0086185 A1* | 5/2004 | Sun | G06F 16/5838 |
| | | | 382/224 |
| 2006/0112091 A1* | 5/2006 | Chapman | G06F 16/3337 |
| 2006/0253427 A1* | 11/2006 | Wu | G06F 16/90324 |
| 2010/0286979 A1* | 11/2010 | Zangvil | G06F 17/273 |
| | | | 704/9 |

OTHER PUBLICATIONS

Kim, et al. "An Unsupervised Approach to Domain-Specific Term Extraction" *Proceedings of the Australasian Language Technology Workshop* Dec. 3, 2009, pp. 1-5.
Extended European Search Report dated Aug. 30, 2018 in European Patent Application No. 18156364.4.

* cited by examiner

SYSTEM AND METHODS OF LANGUAGE PROCESSING

This application claims the benefit of priority to United Kingdom Patent Application No. 1713728.2, filed Aug. 25, 2017, and European Patent Application No. EP18156364, filed Feb. 12, 2018, the entire contents of each of which applications are hereby incorporated by reference in their entirety.

FIELD OF THE INVENTION

The present invention relates to the field of language processing.

BACKGROUND

Computers are typically inadequate with regards to processing natural language, e.g. as spoken or written by humans. This is because input in the form of natural language is not provided in any specific format that the computer is programmed to receive; humans do not typically communicate (e.g. speak or write) in the logical and ordered manner which computers are used to, and so computers may be unable to deal with such input. Computers may be designed to use language processing models so as to improve their processing of text input. Language processing models are designed to infer meaning from a string of input text.

Language processing models may be provided which operate using a plurality of pre-set rules which are coded into the computer. These rules may be coded, by a user, based on the user's experience with a language. For example, such rules may be based on their understanding of formal requirements for correct syntax and semantics of a language. However, to provide for a more robust form of language processing, such rules may also include reference to informalities or regional variations in language, such as slang. Consequently, to create a satisfactory language processing model, capable of dealing with a variety of text input, an inordinate number of such rules would be needed. To address this issue, it has been suggested that statistical methods may be used, in combination with a machine learning element, to identify and learn rules based on the language processor's experience with text input.

Such language processing models may provide limited insight into the contribution that any one individual word makes to the meaning, or essence, of a phrase. Such models are unable to derive meaning from natural language or to attribute semantic meaning to language. In particular, such models are unable to discern the impact that context has on use of natural language.

SUMMARY OF THE INVENTION

Aspects and examples of the present disclosure are set out in the claims and aim to address at least these and other technical problems.

In an aspect there is provided a computer-implemented language processing method for attributing scores to grams of text. The method comprises: (i) obtaining a gram of text relating to a first corpus of text; (ii) determining a score for the gram based on a term frequency of the gram in the first corpus; and (iii) in the event that the term frequency is below a threshold value, determining the score based on a term frequency for the gram in a second unrelated corpus of text.

The scores may provide an indication of semantic importance for each gram (e.g. word) of text in a string of words (e.g. a sentence or description). In particular, the scores may enable a computer to identify the importance one word has in a sentence. For instance, the importance of the word may be determined in relation to both a specific context associated with the sentence and a generic context different to the specific context. This may enable the computer to identify a word which appears, when viewed in the specific context, to be very important in the sentence. However, the computer may also determine that when said word is viewed in a generic (e.g. not the specific) context, it is not very important. Based on this finding, the computer may determine that said word is not very important in the sentence. Therefore, a score may be determined for the word which attributes less importance to it than if the score had been determined based on only the specific context.

The scores may be used to determine similarity between item identifiers comprised of such grams of text. They may be used to infer characteristics for such item identifiers. The first corpus of text may be in the form of at least one first document associated with the first context. The term frequency may provide an indication of the number of occurrences. The same method of determining a score may be applied for both the first corpus and the second unrelated corpus of text. The second unrelated corpus of text could be arbitrary. It could be selected to be a generic overview of text for a language, e.g. the English language. It may be selected to comprise normal, non-specific uses of words. It relates to a different context than the first corpus. The context may be specific to a second context or it may be acontextual. Each corpus may have an associated indication for grams of text which occurred in that corpus and the number of times they occurred.

In an embodiment, the method comprises comparing two item identifiers, each comprising at least one gram of text, based on the determined scores for component grams of the item identifiers. The two item identifiers may be associated with the first corpus of text, or the context thereof.

In an aspect a server may be provided for implementing any of the above methods. In particular, the server may be configured to respond to a query by selecting an item identifier (e.g. a sentence describing an item) which is similar to an indication of an item identifier included in the query. The selected item identifier may be identified by comparing item identifiers with the item identifier in the query. The scores may be used for this comparison so that the comparison takes a greater account of the more important words in the sentence than the less important words. The determined importance for the words in the sentence may be based on both the importance of those words when viewed in their specific context, and the importance of those words when viewed out of the specific context. This may enable words not to be attributed over-importance on the basis of them being less frequently used in the specific context. Thus, a comparison of two sentences may be based on a more general interpretation of the language, and so may be impacted less by (or may be less vulnerable to) the impact of specific context on language processing.

For example, in one aspect there is provided a server comprising a data store storing: (i) at least one first document, wherein the at least one first document comprises a plurality of item identifiers, wherein each item identifier comprises at least one gram of text; and (ii) an association between each said gram and a corresponding gram score. The server also comprises a processor coupled to the data store. The server is configured to obtain a new item identifier comprising at least one gram of text, and for each gram in the new item identifier the processor is configured to determine the corresponding gram score for said gram. Determining a gram score comprises:

In the event that the number of occurrences of the gram of text in the at least one first document is above an occurrence threshold, determining the gram score based on said number of occurrences.

In the event that the number of occurrences of the grain of text in the at least one first document is below the occurrence threshold, determining the gram score based on at least one of: (i) said number of occurrences and (ii) a reference score for said gram. The reference score is based on the number of occurrences of said gram in at least one reference document which is different to the at least one first document.

The processor is configured to assign semantic meaning to each gram in the new item identifier based on a respective determined gram score. The processor may be configured to update the association in the data store based on the gram score determined in this way. Assigning semantic meaning may comprise attributing semantic value to each of the grams in an item identifier (e.g. a contribution from each gram to the overall meaning of that item identifier). The attributed semantic value (i.e. the contribution a gram makes to the overall meaning of an item identifier) is determined based on the gram score for that gram; it may be the gram score for that gram.

In some embodiments, the server is configured to obtain an indication of a query item identifier, e.g. comprised in a query, comprising at least one gram of text, and to determine, based on the updated data store, at least one query gram score for the query item identifier. For example, this may comprise determining a query gram score for each gram in the query item identifier based on the number of occurrences of that query gram in the at least one first document. These query gram scores may be used for comparison between the query gram item identifier and an item identifier in the at least one first document so that an item identifier from the at least one first document may be selected to be used when responding to the query.

The processor is configured to select an item identifier from at least one first document based on the at least one query gram score and the association. For example, the processor may use the at least one query gram score when determining the degree of similarity between the query gram item identifier and an item identifier in the at least one document. The processor may select the item identifier with the highest degree of similarity. The processor may respond to the query by sending a message, to a user device associated with the query. The message may be configured to provide an output at the user device based on the selected item identifier.

As an example, a query may be received which comprises the query item identifier "Chicken Tikka", e.g. the query comprises a request for chicken tikka. The processor may determine a score for each of these grams based on their number of occurrences in the data store. The processor may also determine a score for grams in the data store. Based on the determined scores for component grams, the processor may compare the item identifier "Chicken Tikka" with a plurality of different item identifiers in the data store to find any similar item identifiers. The processor may determine that "tasty chicken tikka" is similar because "tasty" is a common word in generic English and so should not be considered an important word in that item identifier, thus a comparison of the two item identifiers may determine them to be similar. The server may send a message to the UE to provide an output indicative of the item "tasty chicken tikka". For example, this may comprise sending an item associated with the item identifier to a location associated with the UE. For instance, in response to a user of the UE accepting or selecting the item, e.g. based on the received indication of the item identifier in response to their query.

This may enable a score (query gram or gram) to be determined for each gram in an item identifier based on the contents of the data store. In particular, each one of such scores will be indicative of the number of occurrences of the corresponding gram in the at least one first document. Furthermore, the server is able to determine a suitable score for grams which do not occur frequently in the at least one first document. These scores may be used when comparing, and selecting suitable, item identifiers. The selected item identifier may be output to a resource.

It is to be appreciated in the context of this disclosure that reference to the use of the 'number of occurrences of a gram' may include use of a metric derived from the number of occurrences. For example, where an inverse document frequency value is used, which is calculated based on a number of occurrences for a gram, the processor may determine whether or not the inverse document frequency value is less than a threshold or not, and determine how to determine the gram score based on a comparison between the inverse document frequency value and a threshold inverse document frequency value.

Where the at least one first document relates to a certain context of item identifiers, the server may be able to identify a gram in a new item identifier which infrequently occurs in the at least one document.

The number of occurrences of this gram in the at least one reference may then be determined. The at least one reference document may be acontextual or based on a different context to the at least one first document. In which case, the server may be able to determine that a gram which does not occur frequently in the first document is still a common gram, but it is not associated with the at least one first document (or the context thereof). This then enables the server to determine a score for that gram which encompasses the frequency of that gram in a reference document of a different context. Accordingly, the score determined for that gram may be more representative of the overall frequency of occurrence of that gram in the English (or other) language. Therefore, any comparison or selection of item identifiers based on their gram scores may be less influenced by a low frequency of occurrence for a gram in the (contextual) at least one document, in the event that said gram occurs more frequently in the reference document. The determined scores (and thus comparisons/selections based thereon) therefore be able to better cope with the inclusion of acontextual grams in item identifiers, or at least grams from different contexts.

A context may comprise a collection of words, i.e. a subset of vocabulary of a language, which occur in relation to items of that context. For instance, words (or grams of text) associated with a context refer to words which surround a focal point for that context, e.g. they are typically used to describe members of that context. A contextual corpus of text may be defined based on every word used in a set of documents relating to that context. In one example, the context may be restaurants, and the corpus of text comprises each word used on menus for restaurants. In this example, the occurrence of food-specific words may be disproportionately higher than usual, and the occurrence of certain common words which are not applicable to food may be lower than usual. The reference document may provide an acontextual corpus of text. For instance, one which is indicative of the language as a whole such that the frequency with which words occur is representative of a language as a whole, and so e.g. food-specific words will occur less frequently than they would in a food-specific corpus of text. The reference document may therefore provide a normalisation for the number of occurrences of a gram of text in a language as a whole.

The at least one first document may be indicative of a corpus of text. The corpus of text may be associated with a first context. The at least one first document may comprise a plurality of first documents, and the corpus of text is representative of all of the documents. The at least one first document may represent a corpus of text associated with a plurality of other documents. The first document may be in the form of a look up table, wherein each tuple provides an indication of the gram and the number of occurrences. Alternatively, the number of occurrences may be determined on-the-fly, e.g. using a word counting system.

Each item identifier may be indicative of an item, e.g. a physical item. Each document may be indicative of a facility and its item identifiers indicative of items associated with, or available at, that facility. Each gram may be a portion of text comprised within the item identifier. The item identifier may be a string of words describing its item. Selecting an item identifier may enable the server to send an indication of an item to the user, wherein the indication is of an item corresponding to the item identifier and a selected first document (or facility) associated with that item. Each gram may comprise alphanumeric code, for instance it may comprise letters or letters and numbers, or numbers. The association may be between n-grams and corresponding gram score. For instance, it may comprise an indication of item identifiers and corresponding scores.

Each gram score may provide an indication of the number of occurrences of the corresponding gram in the at least one first document, e.g. in a corpus defined by the at least one first document. The gram score is determined based on the number of occurrences; it may be the number of occurrences. The data store may store an association between each gram and a number of occurrences of that gram. Obtaining the new item identifier may comprise receiving it from a user device. For instance, the user device may be associated with a facility, it may be associated with a user of a facility. The new item identifier may be received in a new item identifier message. The new item identifier may comprise an indication of an item identifier. For instance, the new item identifier may be associated with one of the at least one first documents. In such cases, the server may be configured to add the new item identifier to its corresponding first document.

The occurrence threshold may represent a selected criterion, and the gram score being above the occurrence threshold represents the selected criterion being satisfied. For example, gram scores may be in the form of a numeric value, and the occurrence threshold may be in the form of a numeric value, above which the criterion is satisfied. This value may be selected by a user. For example, this selection may be based on a certain degree of significance or probability.

Determining the gram score based on the number of occurrences may comprises, in the event that the gram matches a stored gram (e.g. above a selected degree of similarity), determining the gram score based on the gram score associated with the stored gram. For instance, it may be determined as that gram score. In the event that a stored gram is associated with a number of occurrences of that gram, and the stored gram is determined to be similar to the new gram, the gram score for the new gram may be determined based on the stored number of occurrences for that gram. Determining the gram score may comprise determining an inverse document frequency count for that gram. This comprises determining a score which decreases in proportion with any increases to the number of occurrences in the at least one first document. Determining the reference gram score comprises performing the same method steps, but based on the at least one reference document rather than the at least one first document.

The at least one reference document is configured to be associated with a different context to the at least one first document. For instance, it may be an acontextual document, which could comprise an arbitrary, or selected, corpus of text. The reference document being different to the first document may comprise the reference document being of a different context to the first document; it may comprise the contents (i.e. the item identifiers) being different (e.g. not identical).

Updating the association may comprise, adding an indication of the new gram and/or its determined gram score to the association. In the event that the new item identifier is associated with a first document, it may comprise adding that item identifier to the first document. It may also comprise adding each of the grams to the association. In the event that the new item identifier comprises a gram which does not correspond to any item gram in the data store, it may comprise adding an indication of the new gram and its corresponding determined gram score to the association. Thus, based on the at least one gram may comprise adding the new gram. Updating the association may also comprise updating the corresponding gram score for a gram. For instance, where the gram score is indicative of the number of occurrences of that gram, updating the gram score may comprise updating based on the inclusion of another occurrence of that gram.

Determining based on the updated data store may comprise determining based on the contents of the data store, which includes the newly added gram, and its corresponding determined gram score. For instance, determining the query gram score may comprise a look-up in the data store, and in the event that there is a gram in the association corresponding to the query gram, obtaining the query gram score based on the gram score associated with that gram. The indication of the query item identifier may be comprised in a query, or for example, a query may have been received at another component not part of the server, and an indication of the query and/or the contents thereof was communicated to the server so that relevant query gram scores may be determined. The query item identifier may comprise a plurality of grams of text. These grams may be related to the context of the at least one first document, although some may not. The processor is configured to determine a query gram score for each of the grams in the query item identifier.

The selection may be based on the query gram scores stored in the association. It may include a comparison based at least in part on query gram scores with gram scores. Where the at least one first document comprises a plurality of documents, selecting may comprise selecting one of the first documents, based on that first document comprising an item identifier comprising grams which correspond to the query item identifier. For instance, the server may be configured to select several item identifiers, or several first documents, and send them all to the user device, wherein a user at the user device may be configured to select one of them. In an embodiment, selecting the item identifier is based on a degree of similarity between the query item identifier and each of a plurality of item identifiers in the at least one first document. This may enable item identifiers to be selected which are chosen based on their associated gram scores, which have been determined in the above manner and as such provide for an improved comparison and/or selection process.

The selection may be determined based on each of a plurality of comparisons, wherein each gram in the query item identifier is compared with each gram in each of the plurality of item identifiers in the at least one first document. For instance, this may comprise selecting an item identifier which has the highest degree of similarity with the query item identifier. This similarity may be a combined similarity based on each of its component grams, or it may be an overall similarity between the two item identifiers. The processor is configured to determine the degree of similarity. The comparison between the query item identifier and item identifiers in the association may comprise comparing the query item identifier (its component grams) with each of the item identifiers (and their component grams) in the first document.

In an embodiment, determining at least one query gram score comprises determining, for each gram in the query item identifier, a corresponding query gram score for said gram. Determining the at least one query gram score may be thought of as determining a query score, wherein the query score is based on (e.g. comprises) each individual query gram score for the query grams in the query item identifier. The query gram score is determined in the same manner as for the gram score. In an embodiment, the processor is configured to determine the degree of similarity between an item identifier in a first document and the query item identifier based on the corresponding gram score for each of the at least one grams in the item identifier and the corresponding query gram score each of the at least one grams in the query item identifier. The degree of similarity is determined using each of said grams and said query grams.

In an embodiment, the server is configured to select an item identifier from one of the first documents in the event that the degree of similarity is above a similarity threshold. The similarity threshold comprises a threshold criterion such that in the event that the criterion is satisfied, the item identifier may be selected, and in the event that it is not, the item identifier is not selected. The degree of similarity may be a numerical value. The threshold may be a numerical value, above which the item identifier is selected. The selection may be determined based on identifying the item identifier with the highest value for the degree of similarity. In the event that there is not a degree of similarity above a similarity threshold, the server may be configured to return to the user a selection of at least one item identifier, wherein the at least one item identifier is selected to have a degree of similarity with the query item identifier which is as high as possible out of the possible item identifiers to be selected.

In an embodiment, the processor is configured to determine the degree of similarity based on a weighted combination of the grams in the query item identifier. The weighted combination comprises the processor scaling each query gram score so that its contribution to a total gram score is controlled based on a selected degree of scaling. For instance, the contribution of a gram may be reduced in the event that the gram is associated with a lower gram score.

In an embodiment, each of the at least one grams of the query item identifier is weighted based on its corresponding query gram score. This may enable the scores determined by the processor to be used to balance the weightings applied when determining the degree of similarity and selecting item identifiers. The weighting may comprise scaling the contribution of a query gram based directly on its gram score. For instance, the query gram score may be applied as a numerical coefficient. The ratio of contribution from each query gram to the total score is representative of the query gram scores. It may be proportionate to; it may be equal to. The contribution relates to the semantic importance attributed to a gram. In an embodiment, the processor is configured to determine the degree of similarity between the query item identifier and an item identifier in a first document based on a weighted combination of the at least one gram in said item identifier. In an embodiment, each of the at least one grams of the item identifier is weighted based on its corresponding gram score.

In an embodiment, the processor is configured so that a value for the degree of similarity at the similarity threshold is less than a value for the degree of similarity between two identical item identifiers. The value may be a numerical value, e.g. a continuous or a discrete value. The similarity threshold may also be represented by a value. Two identical item identifiers comprise a first and second item identifier, wherein each item identifier consists of the same number of grams and each gram has an exact counterpart in the other item identifier. The degree of similarity at the similarity threshold is less than this value such that two-non identical item identifiers may be determined to satisfy the similarity threshold. For instance, a first item identifier may comprise the exact second item identifier, as well as at least one other gram. This may be determined to satisfy the similarity threshold.

This may enable the server to determine that two item identifiers have a sufficiently high degree of similarity even though the two item identifiers are not identical. In particular, when the comparison is determined in combination with the weighting system described above, this may enable the system to utilise the determined weightings to assess the degree of similarity, so that, for example highly weighted grams of text contribute more to the overall determination of the degree of similarity. Thus, two item identifiers which appear to differ significantly, e.g. having only one shared gram of text, may be determined to be similar above the similarity threshold because the contribution of the shared gram carried with it a high weighting.

In an embodiment, a plurality of first documents are stored in the data store, each comprising a plurality of item identifiers. The indication of a query item identifier comprises an indication of a plurality of query item identifiers each comprising at least one gram of text. The plurality of first documents may form a corpus of text, each being a portion of the corpus, wherein the corpus is defined based on the inclusion of each item identifier in each of a plurality of the first documents. The data store may comprise an indication of each different gram of text found in each of the first documents. This may be stored associated with the number of occurrences for that gram. One of the plurality of first documents may comprise a summary document comprising an association between each of the grams of text found in the plurality of other first documents associated with the number of occurrences corresponding to each gram. The indication of the plurality of query item identifiers may comprise an indication of a quantity associated with each query item identifier. Each query item identifier may be separate. The indication of the plurality of query item identifiers may be received in a query message which comprises an association between a plurality of query item identifiers and a corresponding indication of quantity.

In an embodiment, the processor is configured to:
Determine query gram scores for each of the at least one grams in each of the query item identifiers.
Determine a degree of similarity between each of the query item identifiers and each of a plurality of item identifiers in the first documents.
Select at least one first document out of the plurality of first documents based on determined degrees of similarity for all of the query item identifiers.

Selecting the at least one first document out of the plurality of first documents based on determined degrees of similarity may comprise accounting for each individual degree of similarity. For instance, the first document may be selected based on it being the document with a highest overall degree of similarity, wherein the overall degree of similarity is determined based on a combination of each of the individual degrees of similarity. The contribution of each individual degree of similarity may be scaled based on an indication of quantity associated with a query item identifier. The selection may be the document comprising the greatest number of item identifiers which have a degree of similarity above the similarity threshold when compared with the query item identifiers. A combination of approaches may be used.

In an embodiment, the indication of a query item identifier is associated with a UE. This may be determined based on the message being received from the UE. It may be determined based on an indication of user device being obtained with the query item identifiers. In an embodiment, the server is configured to send, to the UE, an indication of the at least one selected first documents. The indication of the at least one selected first document may be sent to the UE in a selection message. This may include sending the first document associated with that facility; it may include sending an indication of the facility associated with that first document; it may include sending an indication of the selected items from that first document; or any combination of the above. In an embodiment, each of a plurality of the plurality of first documents is associated with a corresponding facility. For instance, item identifiers may be representative of items associated with that facility. Each item identifier may provide an indication of a respective item.

In an embodiment, in the event that a first document is selected, the server is configured to send an indication of the plurality of selected item identifiers to the facility corresponding to said first document. It may comprise sending an indication of the query item identifiers as well (e.g. in cases where there was not a direct match between them) as this may help alert the facility to the specifics of the original request that had since been re-directed to them. This may be sent to the facility in a facility message. The indication of the plurality of query item identifiers may comprise an indication of item identifiers associated with a first document associated with the facility which have a determined degree of similarity above the similarity threshold when compared with the query item identifiers.

In an embodiment, the processor is configured to send the indication of the plurality of query item identifiers to the facility corresponding to said first document in the event that the server receives an acceptance message from the UE in response to the indication of the at least one selected first documents sent to the UE. The acceptance message may comprise an indication that a user associated with the UE accepts item identifiers associated with the facility. The selection message may comprise an indication of several facilities and/or item identifiers associated with the facilities. In which case, the selection message may comprise an indication of selection by the user of a facility and/or selection of item identifiers. In an embodiment, the acceptance message comprises a selection of one of the at least one selected first documents, and the indication of the plurality of query item identifiers is sent to the facility corresponding to the one first document. In an embodiment, selecting the at least one first document comprises selecting each first document comprising, for each of the query item identifiers, an item identifier having a degree of similarity above the similarity threshold. In the event that none of the item identifiers satisfy the similarity threshold, a first document may be selected which comprises item identifiers with the highest value for the degree of similarity.

In an embodiment, selecting the at least one first document comprises selecting one first document, the one first document being determined based on a combination of each of the degrees of similarity for the query item identifiers. This may include selecting the item identifiers associated with the one first document. Selecting a first document may comprise selecting a facility associated with said first document to be a facility from which the item identifiers are to be selected. In an embodiment, selecting the one first document comprises selecting the document with the highest combination. The combination comprises an average of numeric values for each for each of said degrees of similarity. In an embodiment, the processor is configured to determine the corresponding gram score for a gram of text based on the total number of item identifiers in the data store. In an embodiment, in the event that the reference score for a gram of text is greater than a reference threshold value, the processor is configured to determine a lower gram score for said gram. The reference score being greater than the reference threshold value provides an indication that the gram occurs frequently in the reference document. Determining the lower gram score may comprise reducing a value for the gram score.

In an embodiment, the lower gram score is determined based on the reference score. For example, the reduction in the value for the gram score may be determined based on the value for the reference score. The gram score may be scaled based on a value for the size of the reference score. In an embodiment, determining the gram score for a gram of text comprises reducing the value of the gram score in the event that an original value for the gram score would be larger than a gram threshold. This comprises setting an upper limit threshold to a value for the gram score. In the event this upper limit is exceeded by a value determined for the gram score, then the value for the gram score may be scaled so that it is determined to be a lower value. The gram threshold may be thought of as a criterion, scores greater than it thus not satisfying the criterion. In an embodiment, the processor is configured to determine the size of the reduction to the gram score based on the difference between the original value for the gram score and the gram threshold. The gram score may be determined such that the difference between the originally determined gram score and the gram threshold may be subtracted from the gram threshold, and that value provides the gram score.

In an embodiment, the data store comprises a plurality of trigger grams, wherein the processor is configured to detect a trigger gram in an item identifier and to alter the gram score of any subsequent grams in the item identifier. Trigger grams comprise grams for which the processor is configured to identify and, in response to said identification, cause a selected action to occur. The stored trigger grams are selected to represent grams the use of which provides an indication of natural breaks or subjunctive clauses in an item identifier. For instance, grams which occur after the trigger gram in the item identifier may have their respective gram scores determined based on their location in the item identifier. For example, the scores are indicative of the nature of the trigger gram.

In an embodiment, altering the gram score comprises at least one of: reducing the gram score and separating the item identifier into two portions, a first portion for the grams before the trigger gram and a second portion for the grams after the trigger gram. Reducing the gram score comprises reducing the contribution of the subsequent grams to an overall score for the item identifier. For instance, each portion may have a portion score associated therewith which is determined based on the component gram scores of the portion. The processor may be configured to apply a weighting to each of these portion scores. The weighting applied to the portion after the trigger gram may be configured to reduce that portion score. The processor may be configured to compare two item identifiers based on a comparison between the first portion scores in each respective item identifier. This may enable less important clauses within an item identifier to be considered less, so that a comparison between two item identifiers is focussed on primary clauses within the item identifier.

In an embodiment, the processor is configured to determine the degree of similarity based on a cosine similarity. Cosine similarity comprises transforming a gram of text into a co-ordinate in an n-dimensional vector space, for example using a word embedding. This may be referred to as a 'semantic similarity'. An item identifier may then be located at a position indicative of a combination of the determined positions for each of its component grams. This may be a sum; it may be a weighted sum based on each respective gram score. The location of two item identifiers may then be determined, and the cosine of the angle between them may be determined to provide an indication of similarity between the two item identifiers, based on the direction of their location in the vector space. An indication of these locations, e.g. co-ordinates, may be stored in the data store associated with the relevant item identifier.

In an embodiment, the processor is configured to determine the degree of similarity based on a cosine similarity between the gram weightings for a first item identifier and the gram weightings for a second item identifier. In this case, the co-ordinates for each item identifier are specified by weightings associated with grams in said item identifier, i.e. the respective gram scores. This may be referred to as a 'text similarity'.

In an embodiment, determining the degree of similarity comprises: first, determining a degree of text similarity between a first item identifier and a second item identifier. In the event that the degree of text similarity satisfies a text similarity threshold criterion, the degree of similarity is determined based on this degree of text similarity. In the event that the degree of text similarity does not satisfy the text similarity threshold criterion, the processor is configured to determine a degree of semantic similarity between the first item identifier and the second item identifier. In this case, the degree of similarity is determined based on the semantic similarity. Satisfying the text similarity threshold criterion may include determining that the degree of text similarity is greater than a selected threshold. This value may then be taken as the degree of similarity.

In an aspect there is provided a server for processing a query item identifier. The server comprises a data store storing: (i) at least one first document, wherein the at least one first document comprises a plurality of item identifiers, wherein each item identifier comprises at least one gram of text, and (ii) an association between each gram and a corresponding gram score. The server also comprises a processor coupled to the data store. The server is configured to obtain an indication of a query item identifier comprising at least one gram of text. The processor is configured to determine at least one query gram score for the query item identifier. Determining the query gram score for a gram in the query item identifier comprises:

In the event that the number of occurrences of the gram of text in the at least one first document is above an occurrence threshold, determining the query gram score based on said number of occurrences.

In the event that the number of occurrences of the gram of text in the at least one first document is below the occurrence threshold, determining the query gram score based on said number of occurrences and a reference score for said gram. The reference score is based on the number of occurrences of said gram in at least one reference document which is different to the at least one first document.

The processor is configured to select an item identifier from at least one first document based on the at least one query gram score and the association.

In an aspect there is provided a computer-implemented method of selecting item identifiers in response to a query. The method comprises:

Obtaining a new item identifier comprising at least one gram of text.

Determining a gram score for each gram of text in the new item identifier. Determining the gram score comprises: (i) in the event that the number of occurrences of the gram of text in the at least one first document is above an occurrence threshold, determining the gram score based on said number of occurrences; and (ii) in the event that the number of occurrences of the gram of text in the at least one first document is below the occurrence threshold, determining the gram score based on said number of occurrences and a reference score for said gram. The reference score is based on the number of occurrences of said gram in at least one reference document which is different to the at least one first document.

Updating an association in a data store based on the at least one gram in the obtained item identifier and its corresponding determined gram score. The data store stores: (i) at least one first document, wherein the at least one first document comprises a plurality of item identifiers, wherein each item identifier comprises at least one gram of text, and (ii) the association between each gram and a corresponding gram score.

Obtaining an indication of a query item identifier comprising at least one gram of text, and determining at least one query gram score for the query item identifier based on the updated data store.

Selecting an item identifier from at least one first document based on the at least one query gram score and the association.

In an aspect there is provided a computer-implemented method for processing a query item identifier. The method comprises:

Obtaining an indication of a query item identifier comprising at least one gram of text.

Determining at least one query gram score for the query item identifier. Determining the query gram score comprises: (i) in the event that the number of occurrences of the gram of text in the at least one first document is above an occurrence threshold, determining the query gram score based on said number of occurrences; and (ii) in the event that the number of occurrences of the gram of text in the at least one first document is below the occurrence threshold, determining the query gram score based on said number of occurrences and a reference score for said gram. The reference score is based on the number of occurrences of said grain in at least one reference document which is different to the at least one first document, Selecting an item identifier from at least one first document stored in a data store, wherein the data store stores: (i) the at least one first document, wherein the at least one first document comprises a plurality of item identifiers, wherein each item identifier comprises at least one gram of text, and (ii) an association between each gram and a corresponding gram score, Selecting the item identifier based on the at least one query gram score and the association.

In embodiments, the number of occurrences for a gram in the at least one first document comprises a total number of item identifiers in the at least one first document which include one or more occurrences of said gram. This may enable grams which occur more than once in an item identifier to have a gram score determined therefor which takes account of this and does not determine the number of occurrences of that gram to be higher than is reflective of that gram's usage. For example, for an item identifier such as 'piri piri chicken', a gram score determined which is reflective of the uniqueness of the gram 'piri' would be less compromised in light of that gram being counted as only occurring in one item identifier rather than always being determined to have occurred twice whenever it does occur. The same approach may be taken for determining the number of occurrences of a gram in the at least one reference document.

Alternatively and/or in combination, the number of occurrences may be the absolute total number of occurrences of that grain in the at least one first document (e.g. multiple occurrences of the same gram in one item identifier will be contribute multiple times to the number of occurrences).

In embodiments, the processor may be configured to select the item identifier in the event that the degree of similarity is above a similarity threshold. In embodiments, the processor may be configured to determine the degree of similarity based on a weighted combination of the grams in the query item identifier. In embodiments, attributing semantic importance to each gram of the query item identifier comprises weighting that gram based on its corresponding gram score. In embodiments, the processor may be configured to determine the degree of similarity based on a weighted combination of the grams in the item identifier. In embodiments, attributing semantic importance to each gram of the item identifier comprises weighting the gram based on its corresponding gram score. In embodiments, a degree of similarity at the similarity threshold is less than a degree of similarity between an identical item identifier and query item identifier. In embodiments, wherein the processor is configured to determine the degree of similarity based on semantic importance attributed to: (i) grams in the item identifier and (ii) grams in the query item identifier.

In embodiments, the processor selecting the at least one first document may comprise selecting each first document comprising, for each of the query item identifiers, a respective item identifier having a degree of similarity above the similarity threshold. In embodiments, selecting the at least one first document may comprise selecting one first document based on a combination of the determined degree of similarity between each of the query item identifiers and their respective item identifiers in said one first document. In embodiments, selecting the one first document comprises selecting the document with the highest combination. In embodiments, the processor is configured to determine the gram score for a gram of text based on the total number of item identifiers in the data store. 3433, In embodiments, a method comprises: comparing a query item identifier with at least one item identifier based on determined scores for component grams of the identifiers; and selecting at least one item identifier to be provided as output to the resource based on said comparison.

In an aspect there is provided a computer program product comprising program instructions configured to program a processor to perform any of the methods described or claimed herein.

FIGURES

Embodiments will now be described, by way of example only, with reference to the accompanying drawings in which.

SPECIFIC DESCRIPTION

Figure 1:
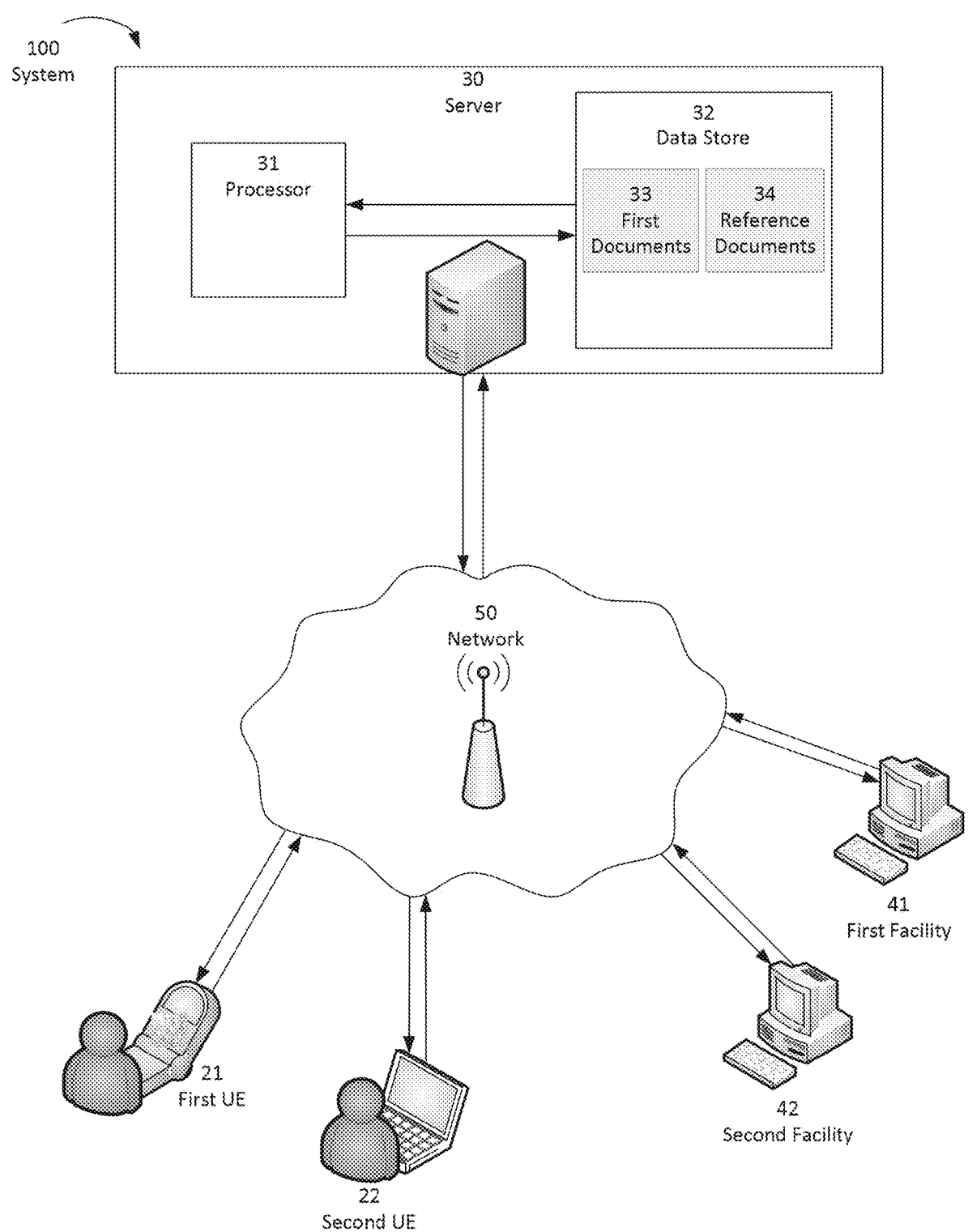
FIG. 1 shows a schematic drawing of a network system.

FIG. 1 shows a network system 100 comprising a server 30 for processing data requests.

The server 30 is arranged to perform a language processing method to process queries. The queries each include item identifiers associated with facilities, which may be indicative of items available at a facility. The method involves determining scores for grams of text (e.g. words). The scores may be used when comparing items in the query with items in a data store. Each item may be described by a plurality of words. The comparison between items in the data store and items in the query may be based on each of the words and their respective scores.

The facilities, and the item identifiers associated therewith, are typically associated with a first context. The context may be a unifying theme common to all items and facilities associated with it. For example, words associated with "food" may define a context. A data store of the server 30 stores an indication of known item identifiers associated with the facilities, e.g. meals offered by different restaurants. These items and facilities are considered to be associated with the first context. When determining the score for a word, the server 30 determines the score based on the number of occurrences of that word in documents in the data store. The data store stores documents comprising information largely pertaining to one context, therefore this number of occurrences provides an indication of the frequency of use of a word in that context. The importance of a word may be approximated based on its frequency of use.

When a word has a low number of occurrences in the documents in the data store, it may be assumed that it does not occur frequently in relation to the overall context of those documents. In which case, the server 30 determines the score for that word based on the number of occurrences of that word in a separate corpus of text (e.g. a second set of documents). The separate corpus of text is not associated with the same context as the documents in the data store. The server 30 may process the queries by selecting and/or comparing item identifiers (e.g. sentences) based on their composite words and the scores determined for those words.

FIG. 1 shows a network system 100 comprising: a first user device, hereinafter user equipment ('UE') 21, a second UE 22, a first facility 41, a second facility 42 and a server 30. Each of the first UE 21, the second UE 22, the first facility 41 and the second facility 42 are connected to the server 30 over a network 50. A first user may operate the first UE 21 to communicate with the server 30, for example to send and receive messages relating to item identifiers in the data store and/or queries about item identifiers. A second user may operate the second UE 22 to also communicate with the server e.g. over network 50.

The server 30 comprises a processor 31 and a data store 32 and a communications interface (not shown) for communication via the network. The processor 31 is coupled to the data store 32 so that it may read and/or write data to the data store 32. The data store 32 stores at least one first document 33. The at least one first document 33 comprises a plurality of item identifiers, and each item identifier comprises at least one gram of text. The data store 32 also stores an association (not shown) between each of these grams of text and a corresponding gram score. The data store 32 is illustrated as also storing at least one reference document 34. These may be stored on volatile and/or non-volatile memory of the data store 32.

The at least one first document comprises a plurality of first documents, each of which comprises a list of item identifiers. Each item identifier comprises at least one gram of text, and so each first document comprises a plurality of grams of text, and thus, across the plurality of first documents, a gram of text may occur in numerous different item identifiers. The gram score for each gram is a value indicative of the number of item identifiers in which that gram occurs. Thus, the gram score represents the number of occurrences of item identifiers including that gram across all of the plurality of first documents. The at least one first document may also include a summary document (not illustrated). The summary document is based on the other first documents. It comprises an indication of each different gram of text which is comprised within any of the other first documents. The summary document comprises, for each different gram of text used in any other first document, an association between that gram and a value indicative of the number of occurrences of that gram in item identifiers in any of the other first documents. The summary document provides a mapping between each different gram of text and a respective corresponding value indicative of the number of occurrences of that gram of text in the first documents. The summary document associates each different gram of text with its corresponding gram score.

A reference document comprises a list of reference item identifiers. Each reference item identifier comprises at least one gram of text, and so the reference document comprises a plurality of grams of text. Grams may occur a plurality of times in a reference document. The at least one reference document comprises a reference summary document, which performs the same function as the summary document above, except the specific grams, and their number of occurrences are different as they are based on a different set of documents. The facility comprises an associated device for interaction with the server. The facility provides a means for distribution of items, including items represented by the item identifiers. The facility may communicate with the server 30 and other UEs over the network.

In operation, the server 30 is configured to obtain a new item identifier. The new item identifier is received from a first facility. The new item identifier comprises at least one gram of text, for example in the form of a string of text which provides an indication of an item associated with a facility, e.g. an item available at the facility. The processor 31 is configured to attribute semantic importance to grams in the item identifiers, which comprises, for each gram of text in an identifier (e.g. the a item identifier, a query item identifier, or an item identifier in the data store), the processor 31 is configured to determine a gram score. Therefore, a new item identifier may have a plurality of gram scores associated therewith, one gram score for each respective gram in the item identifier.

The processor 31 is configured to determine the gram score for a gram of text based on the number of occurrences of the gram in the at least one first document 33 stored in the data store 32. The at least one first document 33 may comprise a plurality of documents, each comprising a plurality of item identifiers. In such a case, the number of occurrences is determined to be the number of occurrences of a gram of text in all of the first documents combined. The data store 32 stores a summary document which stores an association between every different gram of text in the at least one first document 33 and a number of occurrences for each of said grams in the at least one first document 33. The at least one first document 33 may comprise the summary document. The at least one first document 33 may comprise a plurality of first documents and a summary document. Each of the plurality of first documents is associated with a respective facility, and each provides a plurality of item identifiers. The summary document comprises an indication of each gram of text occurring in the plurality of first documents associated with a corresponding number of occurrences for said gram.

The processor 31 parses each gram in the new item identifier using the summary document. Parsing comprises comparing the gram in the new item identifier with grams in the summary document. Parsing comprises performing a textual analysis to determine if two grams match, i.e. they are identical. Parsing is based on textual content of a gram and the structure and order of the characters in the gram. In the event that the processor 31 determines that there is a match, e.g. the gram is already in a first document, and thus in the summary document, the processor 31 determines the gram score based on the stored number of occurrences corresponding to that gram. In the event that the processor 31 determines that there is not a match, the number of occurrences will be determined to be a small number, e.g. close to zero. Such a number is selected for smoothing purposes, as use of zero would produce an inverse document frequency ('IDF') value of infinity. The processor 31 is configured to determine the gram score in two different ways, the selected way being determined based on the number of occurrences of the gram in the first documents. This is determined based on comparing the number of occurrences with an occurrence threshold. The occurrence threshold may be a numerical value which has been selected, e.g. because it represents a statistically significant number.

In the event that the number of occurrences is greater than the occurrence threshold, the processor 31 is configured to determine a gram score for the gram based on this number of occurrences. The processor 31 determines an IDF value.

The gram score may be this IDF value; it may be determined based thereon, e.g. an indication thereof. An IDF value provides an indication of how frequently that gram occurs in the corpus of text. The IDF value may be obtained using the formula:

$$IDF = \log \frac{N}{n_t}$$

Where N represents the total number of item identifiers in the at least one first document stored in the data store 32 (e.g. the number of item identifiers in each of the plurality of first documents). This total number includes each occurrence of an item identifier, so that e.g. an item identifier which occurs 100 times will contribute a value of 100 to the total number of item identifiers. Therefore, this number will be a constant for each calculation (assuming the data set does not grow). Here, $n_t$ represents the number of occurrences of the gram for which the gram score is being determined (i.e. the number of item identifiers in which that gram occurs). This gram score may provide an indication of an inferred importance for the gram, or an indication of how distinguishing that gram is. This is because, if a particular gram occurs very frequently in the at least one first document 33, it may be considered commonplace and thus incapable of adequately distinguishing two different item identifiers. For example, the gram (word): "the" may provide a very small amount of insight or contribution to the overall meaning for the item identifier: "corn on the cob". The processor 31 is therefore configured to determine a low gram score for a gram which has a high number of occurrences in the at least one first document 33.

The at least one first document 33 is associated with a first context. For example, this context may be specific to e.g. a certain field of technology, available goods or services in a particular field or sector, type of activity. A context provides an indication of an overriding association linking the different item identifiers in the at least one first document 33. Each of the item identifiers may be related to one context, which has its own associated frequencies of grams of text occurring. For example, where the at least one first document 33 is associated with the context of rugby, the grams: "line-out" and "scrum" may occur regularly, whereas in different contexts they may not. The frequency of occurrence of these words is thus dependent on the context of the at least one first document 33.

In one example, first documents may relate to takeaway restaurants, the context associated therewith being "food". Each item identifier may therefore represent an item on a menu for a restaurant. The first documents and thus the summary document) will define a first corpus of text, which is based on all of the item identifiers. As a consequence, this corpus of text is specific to the context of "food", and thus when determining an IDF value for a gram of text, the IDF value will be indicative of the frequency of occurrence of said gram in a series of food-specific item identifiers. As an example, when determining gram scores for each of the grams in the item identifier: "tasty chicken cornichon pizza", the processor 31 may determine average scores for the grams: "chicken" and "pizza", as both occur fairly frequently in item identifiers. The processor 31 may also determine high scores for the grams: "tasty" and "cornichon", because neither occur very frequently in the item identifiers.

In the event that the processor 31 compares the number of occurrences of a gram in the at least one first document 33 to the occurrence threshold, and the number of occurrences is below this threshold, the processor 31 is configured to determine the gram score in a different manner. In particular, the processor 31 is configured to determine the number of occurrences of that gram in a reference document 34. As with the first documents, the at least one reference documents may comprise a plurality of reference documents, and the number of occurrences is determined based on the number of occurrences in all of the reference documents. Also, a summary reference document may be provided, which provides an association between each different gram which occurred in the reference documents, and a value indicating the number of occurrences of that gram in the reference documents. In such a case, the processor 31 may be configured to parse the gram in question using the summary reference document, and in the event that the gram matches a gram in the summary reference document, obtain the number of occurrences corresponding to that gram in the reference document.

This obtained reference number of occurrences may be compared with a reference threshold. In the event that the reference number of occurrences is below the reference threshold, the processor 31 is configured to determine that the frequency of that gram in the reference document 34 is insubstantial, and to determine the gram score for that gram based on the number of occurrences of the gram in the first documents, for example, based only on this number of occurrences. In the event that the reference number of occurrences is greater than the reference threshold, the processor 31 is configured to determine the gram score for said gram based on both the reference number of occurrences and the first document number of occurrences. The processor 31 is configured to generate an IDF value for the gram based on the reference documents. This may be determined in the manner described above for the first documents.

The reference documents may be selected to be contextual, or to provide an indication of a general overview of e.g. the English language. For example, articles from Wikipedia may be used as the reference documents. The summary reference document may therefore provide an indication of the number of occurrences, over the whole of Wikipedia, for each different gram of text which occurs in articles on Wikipedia. In the example above, where the context of the first documents is food, it is clear that the context defined by Wikipedia is different to food, and in this case, is generally acontextual.

By determining an IDF value for a gram based on the reference documents, the processor 31 is therefore operable to determine that the gram may be a commonly used gram in the English language, which is just not used commonly in connection with the context of the first documents. In the "tasty chicken cornichon pizza" example, the gram scores for "chicken" and "pizza" may be determined based on the first documents alone, because they occur frequently enough in the first documents. However, the processor 31 would be configured to determine reference scores for the grams: "tasty" and "cornichon" as they do not occur frequently in the first documents. The processor 31 may determine that "cornichon" does not occur frequently in the reference documents. In which case, the processor 31 is configured to determine the gram score for "cornichon" based on the first document IDF value, but not the reference document IDF value. This enables the processor 31 to identify that a gram used in an item identifier is rare in both contexts, and thus may represent a very niche feature.

The processor 31 may determine that "tasty" occurs frequently, and thus has a significant reference IN value. In which case, the processor 31 is configured to determine the gram score based on both the first document IDF value and the reference document IDF value. This may be determined based on a combination of the two, e.g. an average. Alternatively, the gram score may be determined so that the size of the reference score is used to determine the size of reduction to the first document IDF value. For example, one may be subtracted from the other. Thus, the processor 31 is configured to identify grams of text which may seem to be very distinctive when viewed in terms of the first context, but are actually not when viewed in terms of a more general context. In the case of "tasty", this would not provide much of an indication into the meaning or 'essence' of an item identifier. Because the processor 31 is configured to determine the gram score based also on the reference score, the gram score attributed to that gram may be suitably reduced in value to indicate that the gram is commonplace in another, more general, context.

The processor 31 may also be configured so that in the event that an original value for the gram score is greater than a gram threshold, the value for the gram score is reduced. The term 'original value for the gram score' is used to indicate the value for a gram score, as determined above, before this value is modified as set out herein. The gram threshold may be selected based on e.g. a statistical significance. For original values above the gram threshold, the gram score is reduced for example, the gram score may be determined to be the gram threshold minus the difference between the original gram score and the gram threshold. For example, the gram "cornichon" may be determined to have an IDF value (and thus original value for the gram score), which is very high as the gram occurs so infrequently. The gram score for "cornichon" will therefore be determined to be lower than the gram threshold, as it is sufficiently unknown that it is likely to not be distinctive.

The gram scores may thus provide an indication of the contribution that gram may provide to an item identifier, and so how distinctive the gram is. Based on these gram scores the processor 31 is configured to select at least one item identifier in response to obtaining at least one query item identifier. The processor 31 is configured to select the at least one item identifier based on a determined degree of similarity between an item identifier in the first document 33 and the query item identifier. The processor 31 determines this degree of similarity using the determined gram scores for the grams in each item identifier.

The processor 31 is configured to determine a degree of similarity between two item identifiers. For instance, this may be between a query item identifier and an item identifier in a first document 33. The processor 31 may do so using a word embedding. The word embedding is a language model configured to map a gram of text to a location in a vector space, e.g. an N-dimensional vector space. The word embedding as described herein may comprise a neural network architecture. For instance, the word embedding may be an output from such a neural network architecture, e.g. in the form of a look-up table for conversion of grams to vector co-ordinates. This table may have been derived as a result of such a neural network architecture which has determined 'learned weights' for the gram to vector conversion. Either and/or both of the word embedding or the neural network architecture may be used for this conversion.

A suitable neural network architecture comprises at least one layer containing a plurality of neurons. Each neuron is configured to process input data to provide output data. This input data may be received from neurons in a preceding layer, and/or the output data may be provided to neurons in a subsequent layer. Each neuron is configured to perform an operation (e.g. based on a mathematical model or logical architecture) on its input data to provide the output data. Each stream of input data provided to a neuron may have a weighting applied thereto, which acts to scale the different sources of input to the neuron. The network is trained so that the input data may be a string of grams of text (e.g. an item identifier) or it may just be one gram of text. The embedding is configured to analyse input text and determine co-ordinates, in the vector space, based on this input text.

The processor 31 is configured to determine co-ordinates for item identifiers using the word embedding. Each gram in the item identifier contributes to the co-ordinates, e.g. the overall location for the item identifier is a combination of the locations for its composite grams. This may be an average location or a sum. The processor 31 is configured so that the contribution of each gram in an item identifier to the overall location for that item identifier in the vector space is scaled. This scaling for each gram is determined based on its respective gram score. For instance, the gram score may be a numerical coefficient. Thus, grams with higher gram scores will have a proportionately greater influence on the location of an item identifier in the vector space than grams with lower gram scores. Therefore, the processor 31 may be configured to obtain an item identifier, and based on a determined gram score for each gram in the item identifier and the use of the word embedding, a location may be determined for the item identifier in the vector space.

The processor 31 is configured to determine a degree of similarity between two item identifiers based on their respective locations in the vector space. These locations are determined based on the determined gram scores. The processor 31 is configured to determine the degree of similarity based on a cosine similarity between the two item identifiers. The cosine similarity is determined by calculating the cosine of the angle (i.e. based on the displacement of each location from the origin) between the two locations in the vector space. This provides an indication of the similarity of orientation for the two item identifiers. A value for the cosine similarity will be between negative one and one, unless only positive space is considered, in which case the value would be between zero and one. The degree of similarity may be a value based on the cosine similarity value; it may be the cosine similarity value. The cosine similarity between two vectors (the locations of the item identifiers) may be determined using:

$$\text{similarity} = \cos(\theta) = \frac{A \cdot B}{\|A\| \, \|B\|} = \frac{\sum_{i=1}^{n} A_i B_i}{\sqrt{\sum_{i=1}^{n} A_i^2} \sqrt{\sum_{i=1}^{n} B_i^2}}$$

Where A and B are vectors for the two locations, and $A_i$ and $B_j$ are the weighted locations for the component grams. The processor 31 is therefore operable to determine the degree of similarity between two item identifiers. Based on this determined degree of similarity, the processor 31 may be configured to identify a relationship between the two item identifiers. For example, it may be determined that they are exactly the same, or it may be determined that they are similar above a similarity threshold. The similarity threshold may be selected so that two item identifiers may be determined to be similar in the event that their degree of similarity is above the similarity threshold, where the similarity threshold does not require the two item identifiers to be identical. For example, a replacement may be requested for an item identifier, wherein the processor 31 is configured to determine a suitable item identifier to be the replacement. In this example, the suitable item identifier may be determined as an item identifier which satisfies the similarity threshold.

In the "tasty chicken cornichon pizza" example, the processor 31 may determine that the item identifier "tasty chicken cornichon pizza" is similar to "chicken pizza". This is because, as described above, the processor 31 will determine lower gram scores for the grams "tasty" and "cornichon". In which case, a majority of the contribution to the location in the vector space for this item identifier will come from the grams "chicken" and "pizza", and their respective weightings. As these grams and weightings are also found in the "chicken pizza" item identifier, the two item identifiers will be located near to one another in the vector space. It is to be appreciated that selecting different values for the occurrence threshold, the gram threshold and the reference threshold may result in such determinations produce different degrees of similarity. The values for these parameters may be determined as part of training the system, so that suitable degrees of similarity may be determined for known item identifiers for which a desired degree of similarity may be known.

In some embodiments, the processor 31 may be configured to identify the presence of a trigger gram in an item identifier. A trigger gram may represent a type of subjunctive clause or natural break in the language. For example, trigger grams be grams such as "with" or "and", which indicate the presence of clauses in an item identifier—these grams being used to identify a transition from a first clause to a second one. The processor 31 is configured to determine the presence of such trigger grams and to determine the scores for grams in an item identifier based on the presence of these trigger grams. For instance, trigger grams may be detected by parsing the grams in an item identifier against a known set of trigger grams, and determining if there are any matches.

In the event that a trigger gram is detected, the processor 31 is configured to adjust gram scores for that item identifier. This may comprise reducing the gram scores for any subsequent grams after the trigger gram. It may comprise zeroing these gram scores so that only a first portion of the item identifier is used when comparing two item identifiers. This may enable the processor 31 to determine that two item identifiers: "chicken pizza" and "chicken pizza with side salad" are similar, where without the trigger gram being detected and the subsequent grams having a lower gram score; they may not have been determined to be similar. This may enable the processor 31, when comparing two item identifiers, to focus on the primary aspect (first portion) of an item identifier.

In some embodiments, the processor 31 may obtain a query item identifier comprising a trigger gram. In this case, the processor 31 may be configured to detect a trigger gram between a first portion of the query item identifier and a second portion of the query item identifier. In this case, the processor 31 may separate the query item identifier into two query item identifiers, one for each portion. The processor 31 may then look for a first item identifier in the first documents which is similar to the first portion of the query item identifier, and a second item identifier in the first documents which is similar to the second portion of the query item identifier. The processor 31 may therefore be able to determine that "chicken pizza with side salad" is similar to a combination of the item identifiers: "chicken pizza" and "side salad". However, it is to be appreciated that the processor 31 may also determine a degree of similarity based on the full item identifiers as well as and/or before determining based on the separate portions.

Figure 2:
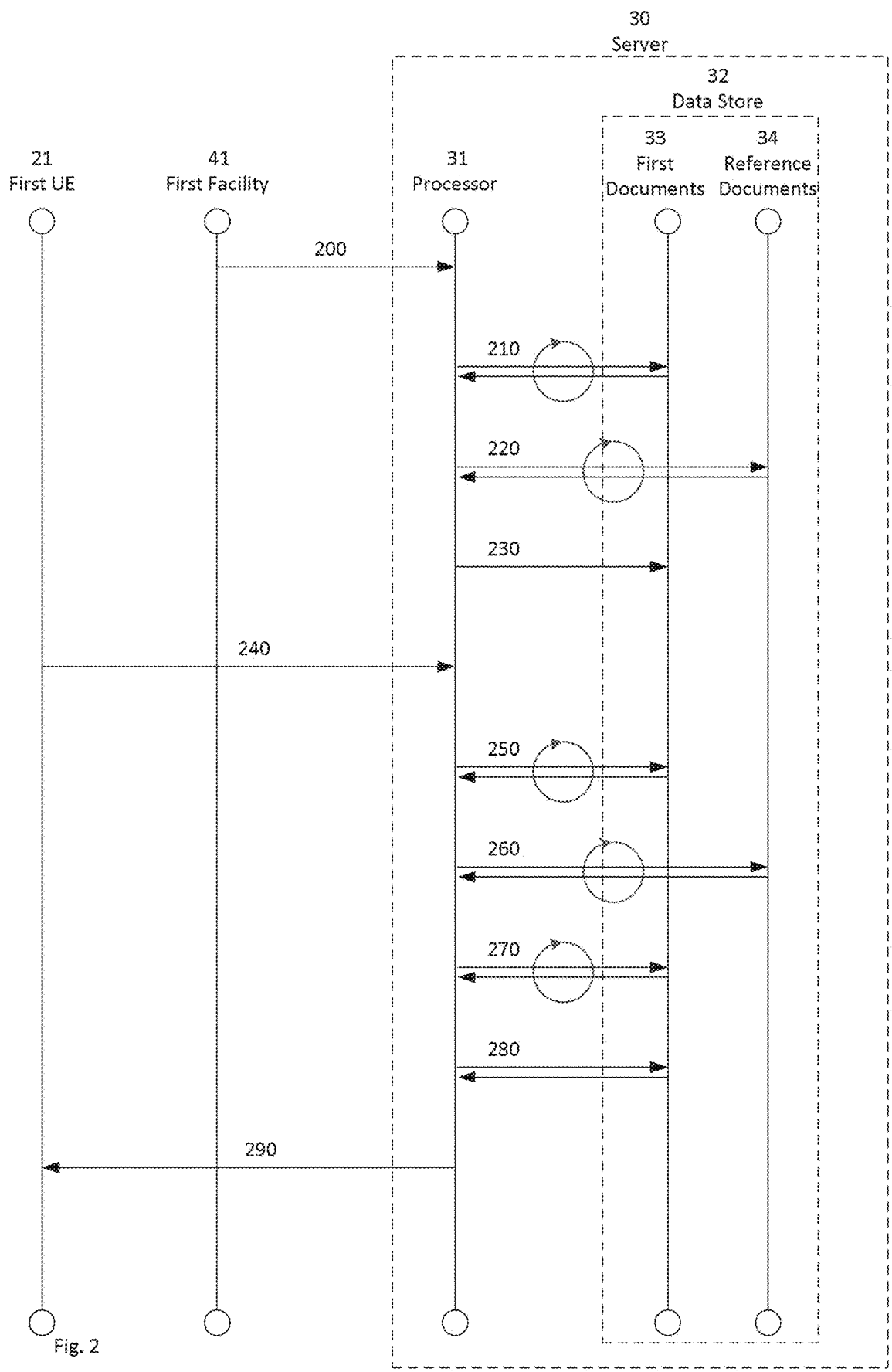
FIG. 2 shows a timing diagram indicating a method of operation using the network system of FIG. 1.

FIG. 2 shows a timing diagram indicating a method of operation using the network system 100 of FIG. 1. In particular, FIG. 2 illustrates communication between the first UE 21 and the server 30, the first facility 41 and the server 30, and processing within the server 30.

At step 200, the server 30 obtains a new item identifier comprising at least one gram of text. This is illustrated as being sent from the facility, for instance an indication of the new item identifier may be sent in a new item identifier message. The new item identifier may be indicative of a new item associated with the first facility 41, e.g. an item which is now available at the first facility 41. In which case, the new item identifier is sent to the server 30 so that the server 30 may add it to the first document 33 associated with that facility in the data store 32. At step 210, for each gram in the item identifier, the processor 31 determines the number of occurrences of that gram in the first documents. In the event that the number of occurrences for a gram is greater than the gram threshold, the processor 31 determines a gram score for that gram, as set out above. In the event that the number of occurrences for a gram is below the gram threshold, the method proceeds to step 220.

At step 220, a gram score is determined for any grams for which the number of occurrences of that gram in the first documents is below the occurrence threshold. The gram score for these grams is based on both the number of occurrences of that gram in the first documents and in the reference documents, and is determined as set out above. At step 230, once all of the gram scores have been determined for the grams in the new item identifier, the new item identifier is stored in the data store 32. This may comprise adding the new item identifier to the first document 33 associated with the first facility 41. It may also comprise storing any new grams in the summary document, so that they may be used for future determinations. It may also comprise updating the stored number of occurrences for each of the grams in the summary document which were also in the new item identifier, i.e. incrementing their respective counts by one to account for the addition of the item identifier (and its component grams) to the data store 32.

At step 240, the processor 31 obtains an indication of a query item identifier. In FIG. 2 this is illustrated as being sent from the first UE 21 to the server 30. For example, this indication may be sent in a query message. This may represent an indication that a user of the first device is requesting an item, and the query item identifier provides an indication of the requested item. At step 250, a query gram score is determined for each of the grams in the query item identifier. The query gram scores are determined as set out above, and in the same manner as for step 210. At step 260, a query gram score is determined as in step 220. At step 270, the query item identifier is compared with item identifiers in the first documents. This comparison is as set out above, and is based on the query gram scores and gram scores associated with the grams in the item identifiers. For each item identifier in the first documents, a degree of similarity may be determined. This determined degree of similarity is compared with a similarity threshold, and in the event that this degree of similarity is above the similarity threshold, the processor 31 is configured to select this item identifier and the method proceeds to step 280.

At step 280, the processor 31 is configured to retrieve (or retrieve an indication of) the item identifier with the degree of similarity with the query item identifier above the similarity threshold. At step 290, the processor 31 sends this indication to the first UE 21. For instance, this may be sent in a response message. The response message is configured to provide an output at the first UE 21. For example, this output may be to display an indication of this item identifier to a user of the first UE 21.

Figure 3:
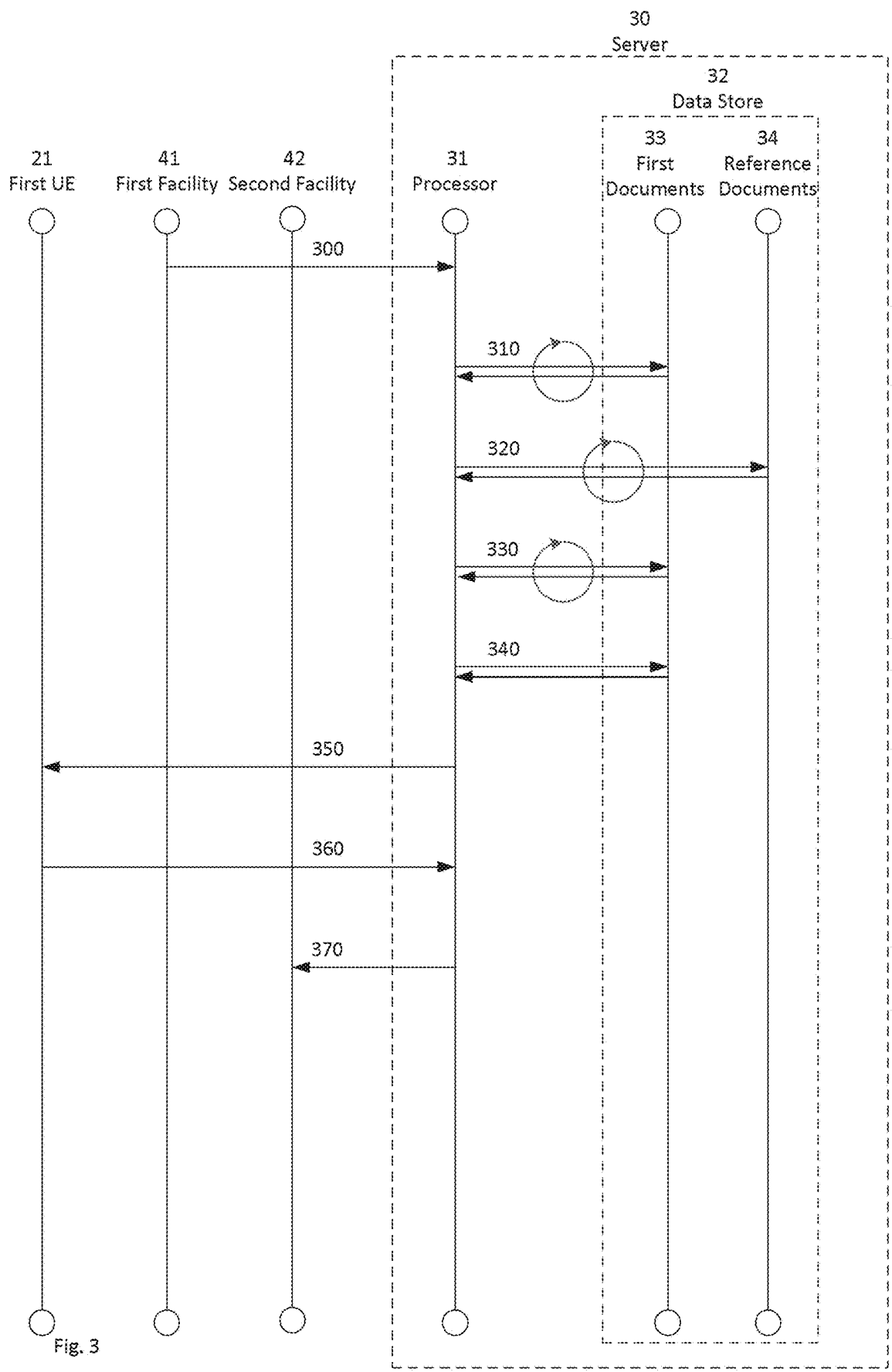
FIG. 3 shows a timing diagram indicating a method of operation using the network system of FIG. 1.

FIG. 3 shows a timing diagram indicating a method of operation using the network system 100 of FIG. 1. In particular, FIG. 3 illustrates communication between the first UE 21 and the server 30, the first facility 41 and the server 30 and the second facility 42 and the server 30, as well as the internal processing of the server 30. FIG. 3 relates to a recovery system for an item identifier. In this case, the server 30 may receive a request for an item from the first UE 21, in the form of the server 30 receiving an indication of an item identifier associated with the first facility 41. This request is communicated from the server 30 to the first facility 41.

At step 300, the first facility 41 sends a request failure message to the server 30. This message comprises an indication that the first facility 41 is unable to process the request from the first UE 21. For instance, the request may be for an item which the first facility 41 no longer has. At step 310, the processor 31 is configured to obtain an indication of a query item identifier associated with the request failure message. For example, messages between the server 30 and the first facility 41 may be associated with an identifier, which may enable the server 30 to look-up the previous messages associated with that identifier which may include an original query item identifier request message from the first UE 21. From this message, the processor 31 may obtain the indication of the query item identifier. The processor 31 is then configured to determine, for each gram in the obtained query item identifier, the number of occurrences of that gram in the first document 33. In the event that the number of occurrences is greater than an occurrence threshold, the processor 31 is configured to determine the query gram score based on the number of occurrences, as set out above. In the event that the number of occurrences is not greater than the occurrence threshold, the method proceeds to step 320.

At step 320, the processor 31 determines the query gram score for any grams not satisfying the occurrence threshold. The processor 31 determines this based on the number of occurrences of the gram in the reference documents, as set out above. At step 330, once the processor 31 has determined a query gram score for each gram in the query item identifier, the processor 31 compares the query item identifier with the item identifiers in the first document 33. This comparison involves determining a degree of similarity between item identifiers in the first documents and the query item identifier. Each degree of similarity is determined as set out above. In the event that the processor 31 determines that an item identifier in one of the first documents has a degree of similarity with the query item identifier above a similarity threshold, the method proceeds to step 340.

At step 340, the processor 31 obtains said item identifier, or an indication thereof, from the first document 33 in the data store 32. At step 350, the server 30 sends an indication of said item identifier in a replacement message to the first UE 21. This message may comprise an indication that the original item identifier associated with the first facility 41 is unavailable, and that a similar item identifier has been found which is associated with a second facility 42. At step 360, the first UE 21 sends, in response to receiving the replacement message, an acceptance message. The acceptance message comprises an indication of whether or not the first UE 21 accepts the item identifier in the replacement message. At step 370, in the event that the acceptance message comprises an indication that the first UE 21 accepts the item identifier in the replacement message, the server 30 is configured to send, to the second facility 42 an item request message. This item request message comprises an indication of: (i) a request for the item associated with the item identifier, and (ii) a user associated with the first UE 21.

In some examples, this method may be considered a method of order recovery, in which an order for an item at one facility which does not succeed is 'recovered'. This is by determining a suitable item at another facility which could be used to 'recover' the order (e.g. by placing the same order at the other facility). In some embodiments, the request failure message may be associated with a plurality of item identifiers. This plurality of item identifiers may be associated with a first facility 41 and thus from a corresponding first document 33 in the data store 32. Each of the plurality of first documents may be associated with a corresponding facility and may comprise a plurality of item identifiers. The item identifiers for a first document 33 may represent items available at the corresponding facility.

In such embodiments, the processor 31 is configured to determine query gram scores for each gram in each of the query item identifiers. These query gram scores are used to determine the degree of similarity, as above. However, when selecting item identifiers from the first documents to replace the original item identifiers, the processor 31 may select them based on an added constraint that all of the replacement query item identifiers must be obtained from the same first document 33. For example, this may relate to recovering an order for some products from one facility by finding a suitable other facility which may offer the same, or suitably similar, products, and re-routing the order to that facility. This may be considered an order recovery problem with a limited solution set.

The processor 31 is configured to determine a degree of similarity between each of the query item identifiers and item identifiers in the first documents. In the event that the processor 31 determines that there is a first document 33 in the data store 32 which comprises, for each query item identifier, at least one item identifier which has a determined degree of similarity above the similarity threshold, the processor 31 may recover the order using that first document 33. This may comprise sending an indication of the first document 33 and an indication of the relevant item identifiers to the first UE 21. In the event that there are a plurality of such first documents, the processor 31 may select the first document 33 comprising item identifiers having the highest overall degree of similarity to the query item identifiers. Alternatively, the processor 31 may be configured to select all such first documents and send an indication of all of the first documents to the first UE 21.

In the event that the processor 31 does not determine that there is a first document 33 in the data store 32 which comprises, for each query item identifier, at least one item identifier which has a determined degree of similarity above the similarity threshold, the processor 31 is configured to select a 'next-best' document. This may comprise the processor 31 selecting the first document 33 having item identifiers which have the highest overall degree of similarity with the query item identifiers. Overall degree of similarity comprises a combination (e.g. average) of each degree of similarity between the relevant item identifiers in the first document 33 and the query item identifiers. Alternatively, the processor 31 may be configured to select the first document 33 which comprises suitable item identifiers so that the greatest possible proportion of the query item identifiers may be matched with an item identifier having a degree of similarity above the similarity threshold.

The server 30 may thus enable an order to be recovered in more circumstances, because an item identifier and a query item identifier may be determined to be similar based on the scoring system described above.

Figure 4:
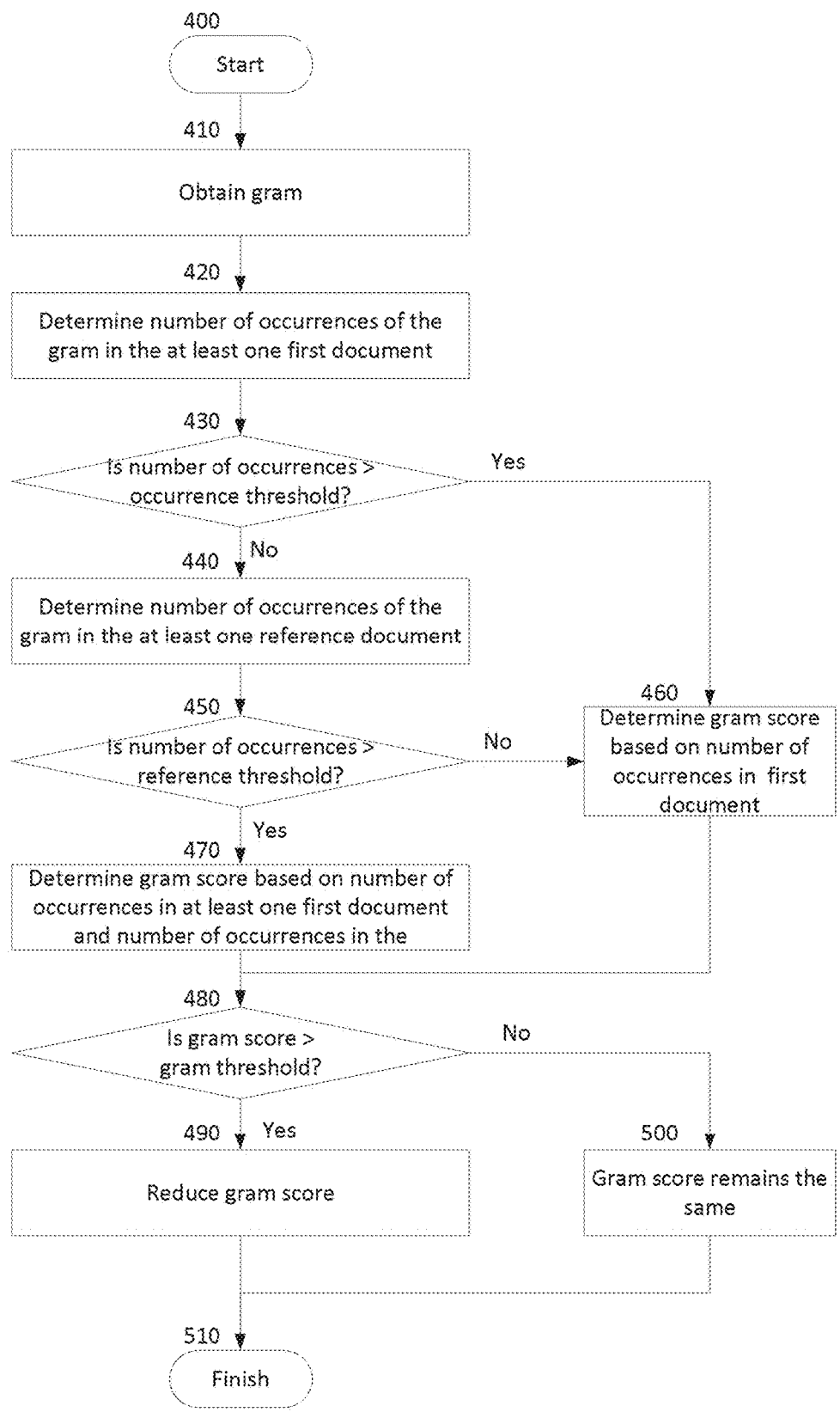
FIG. 4 shows a flowchart illustrating a method of operation of the an example network system as illustrated in FIG. 1.

A method of determining a gram score will now be described with reference to FIG. 4.

At step 400, the method starts and proceeds to step 410 at which a gram is obtained. At step 420, the number of occurrences of that gram in the at least one first document is determined. This is determined as described above, wherein the gram is parsed using the summary document to determine if there is a match for that gram. In the event that there is a match, the number of occurrences corresponding to the matched gram is taken to be the number of occurrences of the gram in the at least one first document. At step 430, the number of occurrences is compared to the occurrence threshold. In the event that the number of occurrences is below the occurrence threshold, the method proceeds to step 440, at which the number of occurrences of the gram in the at least one reference document is determined. As above, this is determined using the reference summary document to determine if there is a match for that gram. In the event that there is a match, the method comprises identifying the number of occurrences corresponding to the gram. The method then proceeds to step 450.

At step 450, the number of occurrences of the gram in the reference document is compared to a reference threshold. In the event that the number of occurrences of the gram in the at least one reference document is less than the reference threshold, or, at step 430, it is determined that the number of occurrences of the gram in the at least one first document is greater than the occurrence threshold, the method proceeds to step 460. At step 460, the gram score is determined based on the number of occurrences of the gram in the at least one first document. The gram score is determined based on an inverse document frequency calculation as described above.

In the event that, at step 450, the number of occurrences is greater than the reference threshold, the method proceeds to step 470. At step 470, the gram score is determined based on the number of occurrences of the gram in the at least one first document and the number of occurrences of the gram in the at least one reference document. The gram score is determined as above in that a score is first determined as it would be at step 460 (i.e. based on the number of occurrences in the first document), this score is then reduced based on a score determined for the number of occurrences of the gram in the at least one reference document. The method then proceeds to step 480. At step 480, the determined gram score is compared to a gram threshold. In the event that the gram score is greater than the gram threshold, the method proceeds to step 490, wherein the gram score is reduced so that it is below the gram threshold as described above. In the event that, at step 480, the gram score is less than the gram threshold, the gram score remains the same as the determined score (e.g. at either one of steps 460 or 470). The method then finishes at step 510.

In some embodiments, the server 30 may be implemented to support the functionality of 'chat bots'. These may comprise any method of enabling a user to provide an indication of an item they wish to order, but without providing an indication of the exact item identifier and facility. For example, this may be in the form of an instant messaging service or voice activated orders. The processor 31 is configured to obtain the indication of the item identifiers from this communication, and to determine gram scores for the indication. Then, as above, a suitable facility and item identifiers may be selected based on their determined degree of similarity to the obtained indications.

In some embodiments, the determined degrees of similarity may be used to determine that item identifiers are directed to the same item even though the item identifiers differ slightly. This may be implemented through the provision of a second similarity threshold selected to indicate a sufficiently high degree of similarity to indicate that two items are sufficiently identical. This may enable the provision of improved analytics. For example, it may enable the processor 31 to perform comparisons (e.g. calculate statistics) between items rather than item identifiers because the processor 31 may determine that all item identifiers within a selected degree of similarity to one another represent the same item and thus may all be used for the same analytic purposes. For example, "chicken tikka", "chicken tikka curry" and "tasty chicken tikka" may all be determined to represent the same item and thus analytics relating to "chicken tikka" may be performed based on all of these item identifiers.

It is to be appreciated in the context of this disclosure that there may be a plurality of similarity thresholds. For instance, a degree of similarity above each threshold may indicate a different classification should be used for the degree of similarity between two item identifiers. For instance, one threshold may indicate an identical or direct match; one may indicate a non-identical but very similar match; one may indicate a similar match. It is to be appreciated in the context of this disclosure that a value for any of the thresholds described herein may be determined in a number of ways. They may be selected based on empirical data, where the thresholds are set so that the determinations may produce a desired outcome. The thresholds may also apply to any suitable metric. For example, the occurrence threshold may be a threshold applied to the IDF values rather than to the number of occurrences. Likewise, the same may be applied for reference IDF values. For example, the gram threshold may be selected to be a certain value so that certain item identifiers are focussed on more than others. This may involve tailoring the threshold to the data set.

It is to be appreciated in the context of this disclosure that any suitable method of using the gram scores and item identifiers may be used to determine the degree of similarity. For instance, term frequency-inverse document frequency values may be used instead of the inverse document frequency values. In which case, the scores and/or values thereof may be adjusted accordingly. Likewise, a different determination of similarity may be used to the cosine similarity. For example, a cosine distance may be used. It is to be appreciated that in the event that the number of occurrences of a gram in the reference document 34 is below the reference threshold, a value for the reference IDF may still be used to determine the gram score. It is to be appreciated that the data store 32 may store, for each gram (e.g. in the summary document), an indication of a previously determined gram score for that document and a previously determined location for that document in the vector space. This may increase the speed of comparisons when compared to determining a degree of similarity based on determining both locations on-the-fly. The processor 31 may be configured to periodically re-determine these values and update their indications in the data store 32 accordingly.

It is to be appreciated that item identifiers need not be selected immediately in response to determining that they are similar to a query item identifier. For example, at step 270 there may be some other method of selecting the item identifier, e.g. still comparing the query item identifier with each item identifier in the first documents and selecting the item identifier with the highest determined degree of similarity, or a selection of the item identifiers with the highest degrees of similarity.

Aspects of the present disclosure may address technical problems relating to natural language processing. For example, in many technical scenarios, human language input (e.g. a string of text) may be provided which needs to be interpreted by a machine, such as a robot, e.g. a computer. In such input, not all words will carry the same amount of semantic weight when viewed in the context of the string as a whole. For humans, experience with the use of language enables the words in the sentence to be attributed a reasonable amount of weight (as appropriate in context). However, programming such experience into a computer is less straightforward. The methods and systems for natural language processing disclosed herein may provide a solution to such technical problems.

For example, embodiments of the disclosure may be used to provide visual interpretation of audio, e.g. speech, data for the hearing impaired to provide improved means for communication. As such, input (e.g. a sentence) may be represented pictographically on a display e.g. using non-alphanumeric indicators to indicate its semantic meaning without the need for verbal transcription, to help enable a person quickly to understand the meaning of what is being communicated to them. It is to be appreciated that this may extend to a study of foreign languages, where a sentence is explained to an individual by showing such an indicator of the meaning of words within that sentence. However, words such as "the" cannot easily be graphically represented, and even if they could be, they are unlikely to provide much of a visual prompt to a user. It is therefore desirable for such a visual prompt based system to be able to identify key words in an input sentence.

As an example, for the phrase "the elephant in the room", some of these words may provide little insight when pictographically represented to a user. However, by presenting the user with a picture of an elephant, and perhaps a picture of a room, the user would easily be able to identify what was being communicated. Embodiments of the present disclosure may provide a computer-implemented method capable of identifying the more important/significant words in a sentence. As such, it may provide a technical solution to improving systems for displaying the content of input text to a user.

Such systems and methods for natural language processing may extend to robotics, where a robot may be required to receive input text such as a command, and the robot is required to interpret said command and in response to perform an action. This approach may also be used when developing chat bots or other such technical means. When presented with an ambiguous input string, such as a sentence with words missing or where instructions were not clearly understood, such technical means may need to make a decision on what action the input command requires. By identifying key components of the command, such robotic systems may be able to infer, or make a more educated guess as to the contents of the input command. For example, for a voice-activated command system such as Amazon Alexa® may receive an input string of text containing many different words, two of which may be "Spotify®" and "Hendrix". From this, it may determine that these grams of text have substantially higher gram scores than other grams in the string, and as such it can determine that these may be more decisive components of the sentence, and may deduce that 'Spotify' should be opened and 'Hendrix' played, without actually receiving that command in full.

The methods and systems described herein may address a technical problem of controlling communication and transport of commodities in a network. By identifying more important component grams in a search query, a central server may be able to respond to a query comprising a string of component grams by providing a series of search results. The search results may be determined based on a use of the present method to determine which results are considered most relevant. Then, in response to the search query, the central server may respond by sending a communication (e.g. a network message) to user equipment associated with the search query. The contents of this message will thus be directly affected as a result of implementation of the present method. Consequently, this communication between separate devices (e.g. one belonging to a host server and one to a subscribing user—such as a mobile telephone or tablet) may be affected.

Furthermore, where this technical problem includes transporting commodities, the contents of the network message sent to the user equipment may also affect the transport of commodities from a first physical location to a second physical location. For example, each commodity included in the search results may be associated with its own physical location, and based on the contents of the search query, a particular commodity (associated with a particular location) may be selected resulting in transport of said commodity from its particular initial location to a specified location. It is to be appreciated that such a technical process of transportation is directly affected as a consequence of the contents of the network message sent to the user equipment. In embodiments, the commodity may be any deliverable good such as manufactured articles, raw materials, perishable goods etc.

The present system and method may enable the provision of more appropriate search results in response to a notional search query. Consequently, in scenarios where a user who receives the search results then has the option of deciding whether or not to select retrieval of the goods (e.g. retrieval of data), the provision of improved search results may increase the likelihood of goods being retrieved. As such, this may have an effect on e.g. a delivery system in terms of increasing requirements for relocation of goods—e.g. physical relocation such as delivery of articles from a first physical location to a designated second location.

Examples have been described above in relation to perishable goods, i.e. such as takeaway food, where the server 30 is used to control orders placed at a series of takeaway restaurants. However, the scope of the claims is considered to extend beyond such examples, and could be used in many more scenarios. For example, the server 30 may be an online library resource, and the server 30 may be configured to determine and identify data associated with item identifiers which are determined to be similar to the query item identifiers. Accordingly, a user may provide an indication of a text they wish to retrieve, and in response the processor 31 may determine if any of the data items in the resource are suitably similar to the received indication, and in the event that they are, the server 30 may send that item, or an indication thereof, to the user.

The user equipment illustrated in FIG. 1 has been described as a mobile telecommunications handset, but it will be appreciated in the context of the present disclosure that this encompasses any user equipment (UE) for communicating over a wide area network 50 and having the necessary data processing capability. It can be a hand-held telephone, a laptop computer equipped with a mobile broadband adapter, a tablet computer, a Bluetooth gateway, a specifically designed electronic communications apparatus, or any other device. It will be appreciated that such devices may be configured to determine their own location, for example using global positioning systems GPS devices and/or based on other methods such as using information from WLAN signals and telecommunications signals. The user device may comprise a computing device, such as a personal computer, or a handheld device such as a mobile (cellular) telephone or tablet. Wearable technology devices may also be used. Accordingly, the communication interface of the devices described herein may comprise any wired or wireless communication interface such as WI-FI®, Ethernet, or direct broadband internet connection, and/or a GSM, HSDPA, 3GPP, 4G or EDGE communication interface.

Messages described herein may comprise a data payload and an identifier (such as a uniform resource indicator, URI) that identifies the resource upon which to apply the request. This may enable the message to be forwarded across the network 50 to the device to which it is addressed. Some messages include a method token which indicates a method to be performed on the resource identified by the request. For example these methods may include the hypertext transfer protocol, HTTP, methods "GET" or "HEAD". The requests for content may be provided in the form of hypertext transfer protocol, HTTP, requests, for example such as those specified in the Network Working Group Request for Comments: RFC 2616. As will be appreciated in the context of the present disclosure, whilst the HTTP protocol and its methods have been used to explain some features of the disclosure other internet protocols, and modifications of the standard HTTP protocol may also be used.

As described herein, network messages may include, for example, HTTP messages, HTTPS messages, Internet Message Access Protocol messages, Transmission Control Protocol messages, Internet Protocol messages, TCP/IP messages, File Transfer Protocol messages or any other suitable message type may be used. The processor 31 of the server 30 (and any of the activities and apparatus outlined herein) may be implemented with fixed logic such as assemblies of logic gates or programmable logic such as software and/or computer program instructions executed by a processor 31. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof. Such data storage media may also provide the data store 32 of the server 30 (and any of the apparatus outlined herein).

It will be appreciated from the discussion above that the embodiments shown in the Figures are merely exemplary, and include features which may be generalised, removed or replaced as described herein and as set out in the claims. With reference to the drawings in general, it will be appreciated that schematic functional block diagrams are used to indicate functionality of systems and apparatus described herein. For example the functionality provided by the data store 32 may in whole or in part be provided by a processor 31 having one more data values stored on-chip. In addition the processing functionality may also be provided by devices which are supported by an electronic device. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

In some examples, one or more memory elements can store data and/or program instructions used to implement the operations described herein. Embodiments of the disclosure provide tangible, non-transitory storage media comprising program instructions operable to program a processor 31 to perform any one or more of the methods described and/or claimed herein and/or to provide data processing apparatus as described and/or claimed herein.

Certain features of the methods described herein may be implemented in hardware, and one or more functions of the apparatus may be implemented in method steps. It will also be appreciated in the context of the present disclosure that the methods described herein need not be performed in the order in which they are described, nor necessarily in the order in which they are depicted in the drawings. Accordingly, aspects of the disclosure which are described with reference to products or apparatus are also intended to be implemented as methods and vice versa. The methods described herein may be implemented in computer programs, or in hardware or in any combination thereof. Computer programs include software, middleware, firmware, and any combination thereof. Such programs may be provided as signals or network messages and may be recorded on computer readable media such as tangible computer readable media which may store the computer programs in not-transitory form. Hardware includes computers, handheld devices, programmable processors, general purpose processors, application specific integrated circuits, ASICs, field programmable gate arrays, FPGAs, and arrays of logic gates.

Other examples and variations of the disclosure will be apparent to the skilled addressee in the context of the present disclosure.

The invention claimed is:

1. A server comprising:
   a data store storing:
      at least one first document, wherein the at least one first document comprises a plurality of item identifiers comprising at least one gram of text; and
      an association between each gram and its corresponding gram score; and a processor coupled to the data store;
wherein the server is configured to respond to a query associated with a user device by sending, to the user device, an indication of an item selected based on semantic importance attributed to grams of text in the query;
wherein attributing semantic importance comprises:
in the event that a number of occurrences of a particular gram in the at least one first document is above an occurrence threshold, determining a gram score for the particular gram based on said number of occurrences;
in the event that the number of occurrences of the particular gram in the at least one first document is below the occurrence threshold, determining the gram score based on: (i) said number of occurrences, and (ii) a reference score for the gram based on a number of occurrences of the gram in at least one reference document different to the at least one first document; and
attributing the semantic importance based on the gram score;
wherein the data store comprises a plurality of first documents comprising a plurality of item identifiers;
wherein the query comprises a plurality of query item identifiers comprising at least one gram of text;
wherein the processor is configured to:
determine a gram score for each gram in each query item identifier;
determine a degree of similarity between each query item identifier and each of a plurality of item identifiers in at least one of the first documents;
select at least one first document based on the determined degree of similarity between each query item identifier and respective item identifiers in each of the at least one first documents; and
send, to the user device an indication of at least one of: (i) the at least one selected first document and (ii) the selected plurality of respective item identifiers in said selected first document;
wherein each of a plurality of the plurality of first documents is associated with a corresponding facility;
wherein the server is configured to receive an acceptance message from the user device in response to the at least one item identifier sent to the user device; and
wherein the acceptance message comprises an indication of whether or not the selected plurality of respective item identifiers for one selected first document are approved.

2. The server of claim 1, wherein sending, to the user device, the indication of the item comprises providing an output to a resource.

3. The server of claim 1, wherein the server is configured to: (i) obtain a new item identifier, and (ii) determine a gram score for each gram of text in the new item identifier.

4. The server of claim 3, where in the processor is configured to update the association between each gram in the new item identifier and their corresponding determined gram scores.

5. The server of claim 1, wherein the indication of the item is selected based on semantic importance attributed to grams of text in the plurality of item identifiers in the at least one first document.

6. The server of claim 1:
wherein, in the event that the acceptance message comprises an approval of the plurality of respective item identifiers from the selected first document, the server is configured to send an indication of said plurality of respective item identifiers to the facility corresponding to said first document.

7. The server of claim 1, wherein in the event that the reference score for a gram of text is greater than a reference threshold value, the processor is configured to determine a lower gram score for said gram; and
wherein the lower gram score is determined based on the reference score.

8. The server of claim 1, wherein determining the gram score for a gram of text comprises reducing a value of the gram score in the event that an original value for the gram score would be larger than a gram threshold; and
wherein the processor is configured to determine a size of a reduction to the gram score based on a difference between the original value for the gram score and the gram threshold.

9. The server of claim 1, wherein the data store comprises a plurality of trigger grams, wherein the processor is configured to detect a trigger gram of the plurality of trigger grams in an item identifier and to alter the gram score of any subsequent grams in the item identifier; and
wherein altering the gram score comprises at least one of: reducing the gram score and separating the item identifier into two portions, a first portion for the grams before the trigger gram and a second portion for the grams after the trigger gram.

10. The server of claim 1, wherein the number of occurrences for a gram in the at least one first document comprises a total number of item identifiers in the at least one first document which include said gram.

11. A computer-implemented method for responding to a query comprising an item identifier relating to a first corpus of text, the method comprising:
attributing semantic importance to grams of text in the query;
wherein attributing semantic importance comprises:
in the event that a term frequency for the gram in the first corpus of text is above a threshold value, determining a gram score for said gram based on said term frequency;
in the event that said term frequency is below the threshold value, determining the gram score based on a term frequency for the gram in a second unrelated corpus of text; and
attributing the semantic importance based on the gram score;
responding to the query by providing output to a resource, wherein the output is selected based on the semantic importance attributed to the grams in the query, wherein the first corpus of text comprises a plurality of first documents comprising a plurality of item identifiers, and wherein the query comprises a plurality of query item identifiers comprising at least one gram of text;
determining a gram score for each gram in each query item identifier;
determining a degree of similarity between each query item identifier and each of a plurality of item identifiers in at least one of the first documents;
selecting at least one first document based on the determined degree of similarity between each query item identifier and respective item identifiers in each of the at least one first documents;
sending, to a user device an indication of at least one of: (i) the at least one selected first document and (ii) the selected plurality of respective item identifiers in said selected first document, wherein each of a plurality of the plurality of first documents is associated with a corresponding facility; and receiving an acceptance message from the user device associated with the query in response to the at least one item identifier sent to the user device; wherein the acceptance message comprises an indication of whether or not the selected plurality of respective item identifiers for one selected first document are approved.

12. A non-transitory computer-readable medium comprising program instructions configured to program a processor to perform the method of claim 11.

* * * * *